May 18, 1937.   G. A. LYON   2,080,492
SPARE TIRE AND WHEEL COVER
Filed Nov. 13, 1933   3 Sheets-Sheet 3
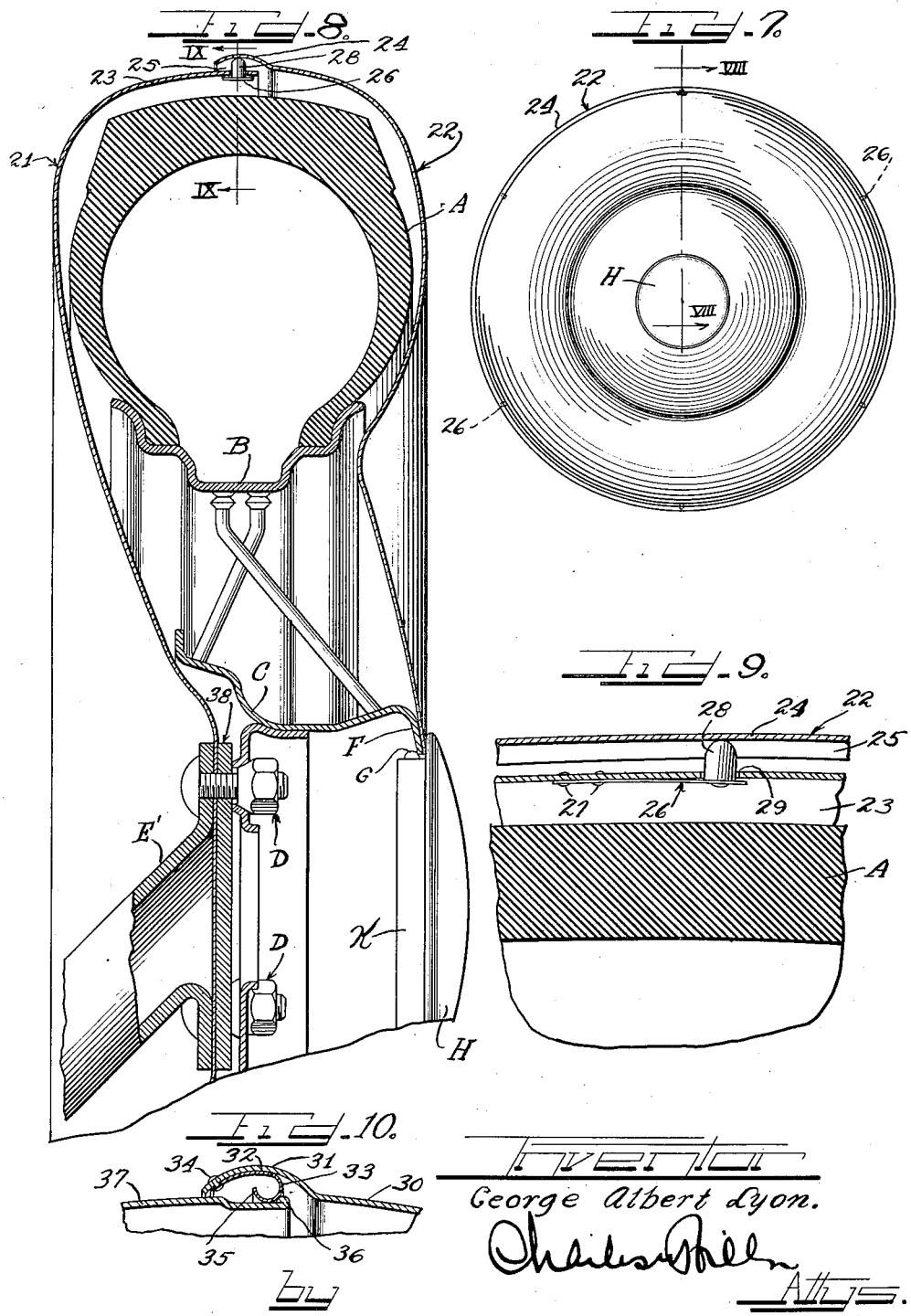

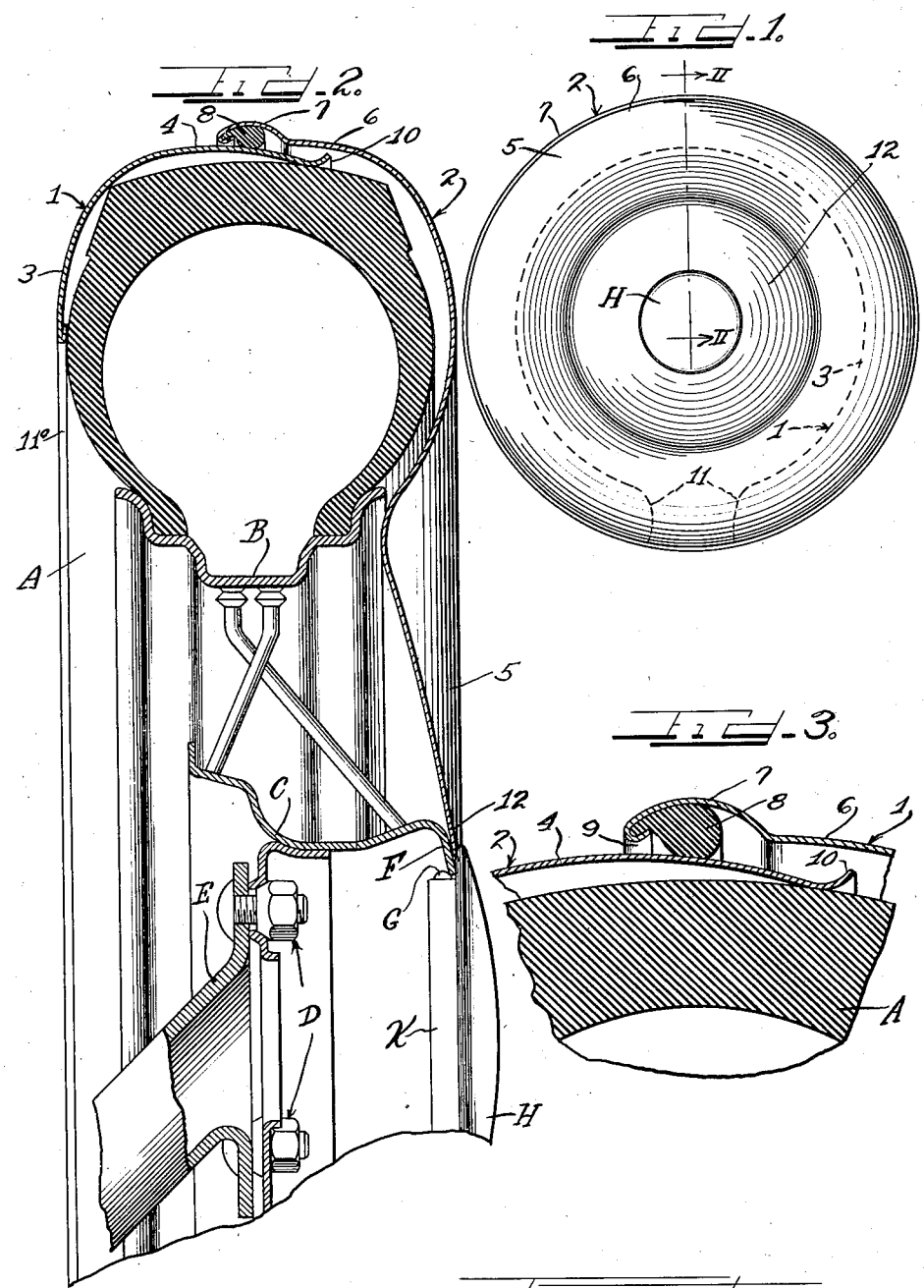

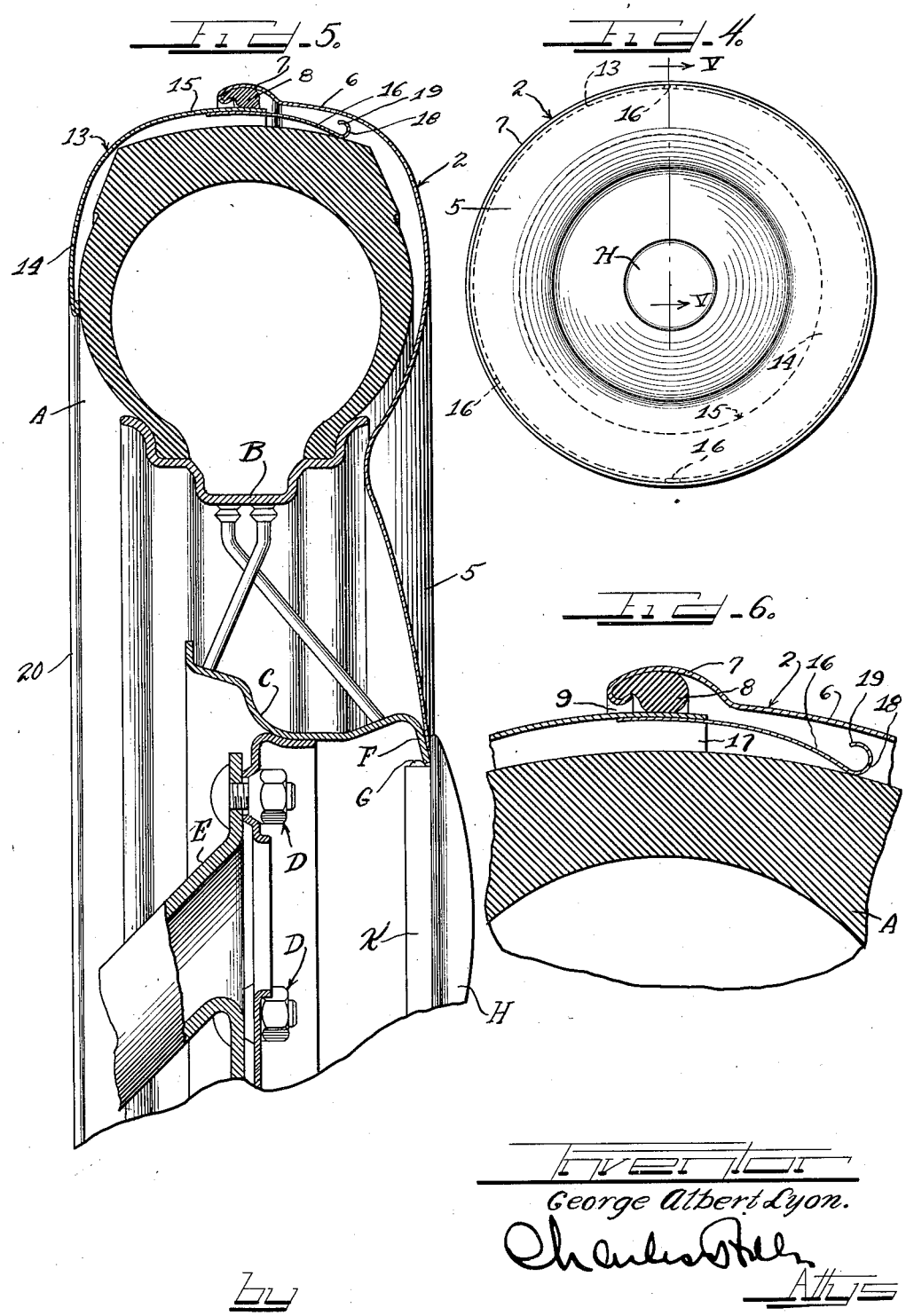

Patented May 18, 1937

2,080,492

UNITED STATES PATENT OFFICE 2,080,492

SPARE TIRE AND WHEEL COVER

George Albert Lyon, Detroit, Mich., assignor to Lyon Incorporated, Detroit, Mich., a corporation of Delaware Application November 13, 1933, Serial No. 697,760

14 Claims. (Cl. 150—54)

This invention has to do with tire covers and is concerned particularly with tire covers of the multi-part type.

It is an object of the invention to provide a tire cover embodying complemental parts separately attachable in position, with cooperative means for preventing accidental separation of the parts.

It is another object of the invention to provide a cover formed to conceal the outer side of a spare wheel as well as the spare tire, embodying telescoping parts individually held in place.

It is a further object of the invention to provide telescoping spare wheel and tire covering instrumentalities with cooperating yieldable means for preventing accidental relative movement between the instrumentalities.

A further object of the invention resides in the provision of a tire cover structure embodying a plurality of telescoping parts arranged to substantially enclose the entire spare wheel and tire and embodying cushioning means for preventing accidental separation of the parts.

In accordance with the general features of the invention, there is provided in one modification a split resilient rim member formed to cover the major portion of the tread and substantially one-half the side wall of the tire from the tread inwardly, to be disposed on the rear side of the tire and because of its inherent resiliency, holding itself on the tire. The complemental tire cover member, according to this modification, comprises a pan-like or drum-shaped member arranged to abut the front side of the wheel hub and to extend outwardly therefrom so as to substantially conceal the entire outer sides of the spare wheel and tire and formed to extend rearwardly so as to telescope the tread covering portion of the first member. Cushioning means carried by one of the members is arranged to be disposed between the members and to bear upon the same when they are in proper cooperative relation so as to frictionally resist separation thereof. The drum-like member may be secured in position by any suitable means, such as the usual hub cap for the tire, the parts being arranged so that the hub cap may be secured to the hub in the usual way so as to simultaneously support the drum-like cover member. The forward margin of the rear cover member is preferably formed so as to hook or interlock with the drum-like member so that removal of the rear member will not be effected accidentally.

In accordance with another form of the invention, the cooperating members are formed so that the rear member, as well as the front member, covers the exposed parts of the spare wheel and tire, the tire cover then constituting substantially a complete enclosure for the spare wheel and tire. The rear member is preferably formed as a permanent part of the vehicle, being secured to the wheel carrier, and one of the members is provided with releasable spring means whereby the members are snapped together telescopically so that the front member is prevented from accidental separation from the rear member, even after the hub cap is removed.

This construction affords a ready assembly of the tire cover parts, which may be formed of any suitable sheet material, such as sheet metal, the parts being extremely few in number and lending themselves to manufacture at low cost.

The invention (in preferred forms) is illustrated in the drawings and hereinafter more fully described.

On the drawings:

Figure 1 is an elevational view showing one form of the invention.

Figure 2 is an enlarged fragmentary sectional view taken substantially in the plane designated by the line II—II in Figure 1.

Figure 3 is an enlarged sectional view of certain details appearing in the upper part of Figure 2.

Figure 4 is an elevational view of another form of the invention.

Figure 5 is an enlarged fragmentary sectional view taken substantially in the plane designated by the line V—V in Figure 4.

Figure 6 is an enlarged fragmentary sectional view of certain details appearing in the upper part of Figure 5.

Figure 7 is an elevational view of a further form of the invention.

Figure 8 is a fragmentary enlarged sectional view taken substantially in the plane designated by the line VIII—VIII of Figure 7.

Figure 9 is an enlarged fragmentary sectional view showing the details appearing in the upper part of Figure 8.

Figure 10 is a view similar to the upper part of Fig. 8 showing a further modified form of the invention.

Referring now more particularly to the drawings, it is noted that the spare tire A is mounted on the spare wheel B having a hub C which may be releasably bolted at D to the carrier E, the latter being preferably permanently secured to an automobile body. The hub is provided with a forwardly projecting wall F whose central opening is of a size to snappingly receive the usual spring latches G of the hub cap H for the wheel.

The tire cover constructed in accordance with the form of the invention appearing in Figures 1, 2 and 3 comprises a rear cover member 1 and a front cover member 2. The rear cover member is in the form of a split ring as shown in dotted lines in Figure 1 and is so curved in cross-section as to provide a portion 3 extending generally radially inwardly so as to conceal the rear side wall of the tire from the tread inwardly so as to cover substantially one-half the rear wall of the tire. The outer portion 4 of the cover member 1 is formed to extend substantially forwardly so as to project to a point in front of the median plane of the tire and engage the tire forwardly of the portion of the tread of greatest diameter. The cover member 1, by virtue of its resilience, hugs the tread of the tire at said forward part, and this hugging characteristic of the cover member 1, together with the fact that the hugging occurs inwardly and forwardly of the portion of the tread of greatest periphery, serves to maintain the cover on the tire against accidental removal therefrom.

The front cover member 2 is formed like a shallow pan or plate so as to extend substantially from the mouth of the front wall F of the hub C to a point somewhat beyond the outermost periphery of the tread of the tire, so as to substantially completely cover the spare wheel and tire from the front from the hub outwardly. This side portion 5 may be dished as shown so as to conform generally to the cross-sectional contour of the spare wheel and tire. The front cover member, at its outer periphery, is provided with a rim portion 6 which extends rearwardly from the side portion 5 to a point preferably somewhat rearwardly of the median plane of the tire when in proper tire protecting position, and so as to be in telescoping engagement with the outer portion 4 of the rear cover member 1. The rim portion 6 is formed with an outwardly convex bead 7 forming an interior socket in which a rubber or other suitable cushioning strip 8 is anchored. Suitable anchoring means is provided by the return-bent margin 9 of the bead 7, between which margin and the remainder of the bead the cushioning strip 8 is securely held. The strip 8 preferably projects radially inwardly of the adjacent portions of the rim portion 6 so as to prevent contact between the cover members 1 and 2, and so as to be compressed between the cover members 1 and 2 when the parts are properly telescoped together. This results in a substantial frictional pressure between the cushioning strip 8 and the cover member 1 and serves to prevent accidental separation of the parts.

The forward marginal portion of the outer part 4 of the cover member 1 is turned outwardly at 10 so as to be engageable with the inner part of the strip 8 so as to provide a temporary retainer for preventing the cover member 2 from falling when the hub cap H is removed. The outwardly turned edge portion 10 is arranged so as to slip by the cushion member 8 when the attendant pulls the front member 2 forwardly off the spare wheel and tire, and, by the same token, the cushion strip will readily slip over the out-turned portion 10 when it is desired to telescope the front cover member 2 onto the rear cover member 1.

The carrier E may be positioned at any part of the automobile such as at the rear or adjacent a well in the running board or fender. When used in conjunction with a well, the latter serves to cover the lower part of the spare tire and possibly a portion of the lower part of the wheel, in which event, if desired, the cover members may be formed so as to cover substantially only the portions of the spare wheel and tire exposed above the well.

If desired, in order that the ends 11 of the rear cover member 1 may be more readily grasped, to enable the attendant to exert an expansive pressure thereon and to enable him to more easily handle the same, finger grips or handles (not shown) may be secured to said end portions of the cover member 1.

To provide a smooth edge so as to avoid cutting or scratching of the hands, the free inner edge portion 11a of the cover member 1 is bent upon itself.

The side portion 5 has a central opening of substantially the same size as the opening in the front wall F of the spare wheel hub C, so as to allow the skirt of the hub cap H to pass therethrough and snap into engagement with said wall F as shown in Figure 2. When the cover member 2 is in proper position, the inner peripheral portion 12 thereof is preferably disposed so as to engage the wall F of the hub C and also the head of the hub cap H so as to be sandwiched therebetween, the spring latches G thus performing the double function of releasably holding the hub cap H in place and holding the cover member 2 against rattling with respect to the wall F and hub cap, the cover being elsewhere clear of the spare wheel and tire.

The form of the invention shown in Figures 4, 5 and 6, differs from that described only in the construction of the rear cover member. The rear cover member of Figures 4, 5 and 6 is shown at 13 in the form of preferably a complete circle as is indicated by the dotted lines in Figure 4, the inwardly extending side portion 14 covering substantially half of the rear wall of the tire from the tread inwardly, and the outer peripheral portion 15 extending forwardly over the tread of the tire so as to project preferably somewhat forwardly of the median plane of the tire. The outer peripheral portion 15 is formed so as to extend clear of the part of the tire of greatest periphery. A plurality of spring fingers 16 is secured to the marginal portion 17 of the outer peripheral part 15 as by spot-welding, riveting or other suitable means, so as to project forwardly and inwardly to such an extent as to resiliently grip the tread of the tire appreciably forwardly of the median plane thereof. The number of such gripping elements may be varied as desired, six being shown as in dotted lines in Fig. 4 for illustrative purposes only. The springs 16 by their inherent resiliency frictionally engage the tread of the tire so as to resist relative movement therebetween and in addition, the portion of the tread of maximum diameter offers an obstruction requiring a force to expand or move outwardly the spring elements 16 before the latter can be moved rearwardly off the tire A. Thus the springs 16 serve to resiliently hold the rear cover member 13 in proper tire protecting position.

The spring elements 16, at their forward ends, are curled outwardly and rearwardly upon themselves to form a rounded cam surface 18 to enable said elements to be cammed outwardly by the rear part of the tread as the cover member 13 is moved forwardly onto the tire. The end of the curled portion constitutes a hook 19, the edge of which is so arranged as to engage the cushion strip 8 at its inner periphery so as to temporarily hold the cover member 2 from slipping off the tire when the hub cap H is removed. A pull by the operator will serve to force the strip 8 by the end 19 of each spring 16 so as to enable the front cover member 2 to be removed by the operator whenever desired. The cover member 2 cooperates with the hub cap H and hub C in the same manner as in Figures 4, 5 and 6 as described in Figures 1, 2 and 3, and to explain this cooperation at this time would be needless repetition.

The cover member 13 is curled or bent upon itself at its inner edge 20 to provide a smooth surface so as not to scratch or tear the hands or clothing of the person handling the same.

In the two forms of the invention just described, it will be observed that the parts of the cover are so constructed as to enable the front cover member to support the rear cover member even in the absence of a tire.

It will further be noted that the cushion strip 8 is preferably arranged so as to be disposed substantially in the median plane of the tire when in proper tire protecting position.

A further modified form of the invention is shown in Figures 7, 8 and 9, wherein the cover comprises complemental half cover members 21 and 22 arranged to telescope together and cooperate in such a manner as to form an enclosure for the entire spare wheel and tire, in conjunction with a spare wheel hub cap H. The cover members are formed in cross-section to simulate the cross-sectional shape of the spare wheel and tire.

The rear cover member 21 may be formed substantially imperforate except for the holes to receive the bolt means D being preferably permanently united with the flange structure of the carrier E. The rear cover member 21, at its outer periphery, extends forwardly at 23 to a point somewhat forward of the median plane of the tire and is of such diameter as to accommodate tires of different diameters.

The front cover member 22 is formed substantially similar to the front cover member 2 previously described except for the cushioning strip which is omitted. The front cover member 22 is formed, as in the case of the cover member 2, with a marginal outwardly convex bead 24 which extends rearwardly somewhat beyond the median plane of the tire so as to be positioned outside of and telescope the outer peripheral part 23 of the rear cover member 21. The bead 24 affords an inner socket 25 in which the spring-latches 26, carried by the marginal part of the rear cover member 21, are releasably received. The number of latches employed may vary as desired, six being employed for illustrative purposes only as shown in dotted lines in Figure 7. Each latch preferably comprises a leaf-spring disposed on the inner side of the portion 23 and secured at one end thereto as by rivets 27, spot-welding or the like, and includes, at its outer end, a knob 28 arranged to project through a corresponding opening 29 in the portion 23, said opening being arranged to be positioned radially inwardly of the bead 24 of the front cover member 22. The knob 28 is preferably formed of resilient or cushioning material such as rubber and is of such size as to project into and yieldably be held by the spring in engagement with the bead 24. The knob 28 is rounded at its outer end to enable the same to be cammed inwardly by the free edge of the bead 24 when the front cover member 22 is being applied telescopically with respect to the cover member 21.

It will be observed that the latches 26 will hold the front cover member 22 temporarily in position when the hub cap H is removed and before the same is applied. The construction is such that neither of the cover members is dependent on the tire A for its support, so that even with the tire removed, the cover structure may be assembled exactly as shown in Figures 7, 8 and 9. The front cover member 22 is in effect supported by the rear cover member 21 through the latch instrumentalities 26, so that, even in the absence of a wheel, the cover structure may be assembled in the relationship shown.

In the form of the invention shown in Figure 10, a modified construction for enabling the marginal portions of the cover members to cooperate is shown. In this form of the invention, the front cover member 30 is formed with an outwardly convex bead 31 affording a peripheral pocket 32 in which a spring 33 is anchored as by riveting 34, spot-welding or the like. The spring 33 conforms generally to the transverse shape of the bead 31 and extends forwardly and is curled inwardly, then rearwardly and outwardly to form an open loop providing an arcuate inner cam surface 35 which engages the rounded free edge portion 36 of the rear cover member 37 and slips over the same when the cover members 30 and 37 are brought into telescoping relation or are separated. When the cover members are connected as shown in Figure 10, the rear cover member 37 will support the front cover member 30 independently of the hub cap H, the rounded portion 36 of the rear cover member projecting outwardly beyond the innermost surface of the spring 33 so as to prevent the front cover member from falling accidentally, but permitting the front member 30 to be withdrawn upon force applied by the attendant. The free edge of the bead 31 is preferably bent upon itself to provide a smooth surface so that the same may be handled without danger of tearing the clothing or hands.

The bead formed at the rear of the front cover member in each of the forms of the invention described is arranged substantially symmetrically with the median plane of the tire and has a desirable ornamental effect. The bead also has an ornamental characteristic which lends beauty to the cover and accordingly to the vehicle on which the same is mounted. The bead further provides a projection behind which the fingers may be positioned to facilitate removal of the front cover.

The hub cap herein shown and described consists of the usual type of structure embodying spring latches which snap into interlocking engagement with the front wall F of the hub C. It is well within the province of the invention, however, to employ a hub cap which is locked as by a key to the hub.

The carrier structure E' shown in Figure 8, because of the rear cover member 21, has a built-up flange structure 38 secured together as a unit in which the cover member 21 is preferably permanently sandwiched in any suitable manner as by welding, brazing, riveting or the like.

The yieldable means of the different forms of the invention may, if desired, be reversed as to the respective cover members without departing from the spirit of the invention.

I am aware that changes may be made and numerous details of construction may be varied through a wide range without departing from the principles of this invention, and I, therefore, do not purpose limiting the patent granted hereon, otherwise than is necessitated by the prior art.

I claim as my invention:

1. An automobile spare wheel and tire cover construction comprising a member of substantially form-retaining sheet material formed to cover one side of a spare wheel and tire carried thereby and to extend from said side over the tread of the tire, an expansible and contractible ring member for engaging the first member and tire and formed to contract by its own resilience into position to hold itself on the tire, means associated with said members for establishing frictional contact therebetween to enable the second member to yieldably hold the first member in position, and means independent of the ring member for supporting the first member in substantially coaxial relation to the wheel.

2. An automobile spare wheel and tire cover construction comprising a member of substantially form-retaining sheet material formed to cover one side of a spare wheel and tire carried thereby and to extend from said side over the tread of the tire, an expansible and contractible ring member for engaging the first member and tire and formed to contract by its own resilience into position to hold itself on the tire, and means associated with said members for establishing frictional contact therebetween to enable the second member to yieldably hold the first member in position, the ring member being formed so as to extend inwardly and on opposite sides of the tread part of greatest diameter, whereby the tread part obstructs accidental removal of the ring member.

3. An automobile spare wheel and tire cover construction comprising a member of substantially form-retaining sheet material formed to cover one side of a spare wheel and tire carried thereby and to extend from said side over the tread of the tire, an expansible and contractible ring member for engaging the first member and tire and formed to contract by its own resilience into position to hold itself on the tire, and means associated with said members for establishing frictional contact therebetween to enable the second member to yieldably hold the first member in position, the ring member being formed so as to extend inwardly and on opposite sides of the tread part of greatest diameter, whereby the tread part obstructs accidental removal of the ring member, the first member being formed with a bead arranged in substantially the median plane of the tire when in proper position, said means comprising a cushion strip disposed within said bead and projecting inwardly so as to frictionally contact the ring member.

4. An automobile spare wheel and tire cover construction comprising a member of substantially form-retaining sheet material formed to cover one side of a spare wheel and tire carried thereby and to extend from said side over the tread of the tire, an expansible and contractible ring member for engaging the first member and tire and formed to contract by its own resilience into position to hold itself on the tire, and means associated with said members for establishing frictional contact therebetween to enable the second member to yieldably hold the first member in position, the ring member being formed so as to extend inwardly and on opposite sides of the tread part of greatest diameter, whereby the tread part obstructs accidental removal of the ring member, the first member being formed with a bead arranged substantially in the median plane of the tire when in proper position, said means comprising spring means disposed within said bead and projecting inwardly so as to frictionally contact the ring member.

5. A tire cover construction comprising a tire casing of substantially form-retaining sheet material formed to cover one side wall of a tire and to extend over the periphery thereof, and a radially expansible and contractible ring formed to project between and frictionally engage the peripheral portion of said casing and the tire and inherently contractible to hold said casing and itself in position on the tire by its contraction.

6. A tire cover construction comprising an annular member made of substantially form-retaining sheet material and formed in cross-section to cover a side wall of a tire and to extend over the periphery thereof, a second annular member made of substantially form-retaining sheet material and formed in cross-section to cover a part of the other side wall of the tire and to extend over the periphery thereof so as to engage between the peripheral portion of the first member and the tire, means carried by one of the members and frictionally engageable with the other member to yieldably hold the same in assembled relation, and spring means carried by the second member and arranged to grip the tread of the tire inwardly of the outermost periphery thereof and opposite to the side covering portion of the second member so as to provide a yieldable support for the entire cover structure on the tire.

7. A tire cover construction comprising an annular member made of substantially form-retaining sheet material and formed in cross-section to cover a side wall of a tire and to extend over the periphery thereof, a second annular member made of substantially form-retaining sheet material and formed in cross-section to cover a part of the other side wall of the tire and to extend over the periphery thereof so as to engage between the peripheral portion of the first member and the tire, means carried by one of the members and frictionally engageable with the other member to yieldably hold the same in assembled relation, and spring means carried by the second member and arranged to grip the tread of the tire inwardly of the outermost periphery thereof and opposite to the side covering portion of the second member so as to provide a yieldable support for the entire cover structure on the tire, said spring means being provided with outwardly projecting abutment means for preventing accidental separation of said members.

8. In combination in a spare wheel assembly on an automobile, including a spare wheel for carrying a tire and including a hollow central hub: a supporting member for the wheel and disposed in cooperation with the back of the hollow wheel hub, a spare tire cover having a central apertured part formed to accommodate a closure in the form of a hub cap for said hub, said part adjacent the aperture being formed to be sandwiched between the hub and the hub cap so that when the cap is attached to the hub, it serves to hold the apertured part in position, another part of the cover secured to the supporting member, and means for holding the parts in assembled relation so that when the hub cap is absent, the apertured part will not accidentally be removed.

9. In combination in a spare wheel assembly on an automobile, including a spare wheel for carrying a tire and a supporting member for the wheel, a cover structure comprising complemental members each being formed so as to cover a side of the spare wheel and tire and to extend over the tread of the tire so as to telescope with each other, one of the cover members being provided with inwardly projecting spring means arranged to exert pressure on the other of the cover members so as to yieldably hold the members in assembled relation, one of said members having projecting means arranged to engage beyond the spring means to obstruct the same to prevent accidental separation of the cover members.

10. An automobile spare wheel and tire cover construction comprising a member of substantially form-retaining sheet material formed to cover one side of a spare wheel and tire carried thereby and to extend from said side over the tread of the tire, an expansible and contractible ring member for engaging the first member and tire and formed to contract by its own resilience into position to hold itself on the tire, and means associated with said members for establishing frictional contact therebetween to enable the second member to yieldably hold the first member in position substantially entirely by friction.

11. An automobile spare wheel and tire cover construction comprising a member of substantially form-retaining sheet material formed to cover one side of a spare wheel and tire carried thereby and to extend from said side over the tread of the tire, an expansible and contractible ring member for engaging the first member and tire and formed to contract by its own resilience into position to hold itself on the tire, means associated with said members for establishing frictional contact therebetween to enable the second member to yieldably hold the first member in position substantially entirely by friction, and means independent of the ring member for supporting the first member insubstantially coaxial relation to the wheel.

12. An automobile spare wheel and tire cover construction comprising a member of substantially form-retaining sheet material formed to cover one side of a spare wheel and tire carried thereby and to extend from said side over the tread of the tire, an expansible and contractible ring member for engaging the first member and tire and formed to contract by its own resilience into position to hold itself on the tire, and means associated with said members for establishing frictional contact therebetween to enable the second member to yieldably hold the first member in position, the ring member being formed so as to extend inwardly and engage the tire on opposite sides of the tread part of greatest diameter, whereby the tread part obstructs accidental removal of the ring member.

13. A tire cover construction comprising a cover member made of substantially form-retaining sheet material and formed in cross-section to cover a side wall of a tire and to extend over the periphery thereof, a second cover member made of substantially form-retaining sheet material and formed in cross-section to shield the other side wall of the tire and to extend over the periphery thereof so as to engage between the peripheral portion of the first member and the tire, means carried by one of the members and frictionally engageable with the other member to yieldably hold the same in assembled relation, and spring means carried by one of the members and arranged to grip the tire inwardly of the outermost periphery thereof and opposite to the side shielding portion of the member carrying said spring means so as to provide a yieldable support for the entire cover structure on the tire.

14. A tire cover construction comprising a cover member made of substantially form-retaining sheet material and formed in cross-section to cover a side wall of a tire and to extend over the periphery thereof, a second cover member made of substantially form-retaining sheet material and formed in cross-section to shield the other side of the tire and to extend over the periphery thereof so as to engage between the peripheral portion of the first member and tire, and spring means carried by one of the members and arranged to grip the tire inwardly of the outermost periphery thereof and opposite to the side-shielding portion of the member carrying said spring means so as to provide a yieldable support for the entire cover structure on the tire, said spring means being provided with outwardly projecting abutment means engageable with the other member for preventing accidental separation of said members.

GEORGE ALBERT LYON.